No. 757,406. PATENTED APR. 12, 1904.
L. LYNDON.
BOOSTER APPARATUS.
APPLICATION FILED AUG. 21, 1902.
NO MODEL.
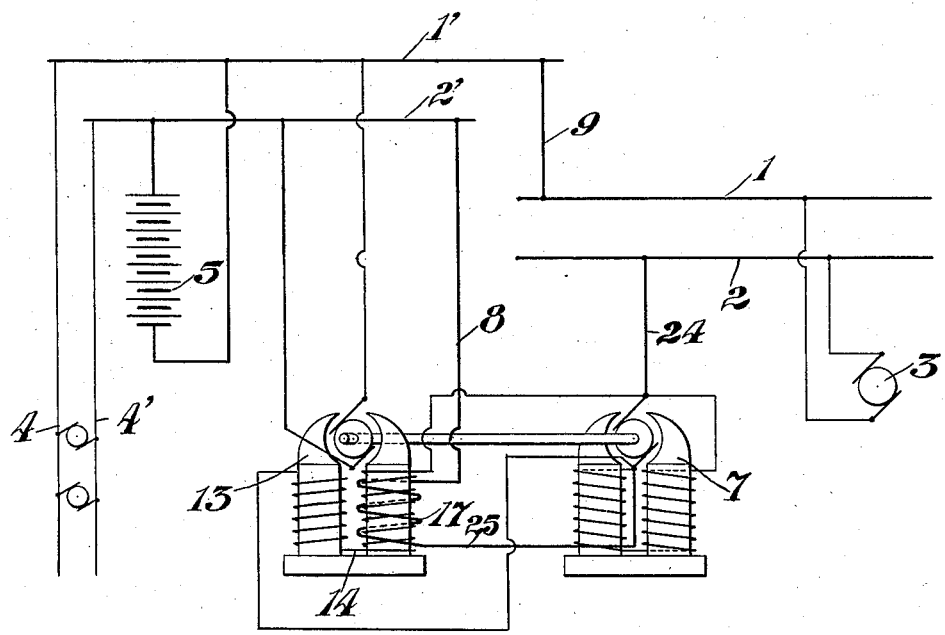

No. 757,406. Patented April 12, 1904.

UNITED STATES PATENT OFFICE.

LAMAR LYNDON, OF NEW YORK, N. Y., ASSIGNOR TO NATIONAL BATTERY COMPANY, OF JERSEY CITY, NEW JERSEY, AND BUFFALO, NEW YORK, A CORPORATION OF NEW JERSEY.

BOOSTER APPARATUS.

SPECIFICATION forming part of Letters Patent No. 757,406, dated April 12, 1904.

Application filed August 21, 1902. Serial No. 120,440. (No model.)

*To all whom it may concern:*

Be it known that I, LAMAR LYNDON, a citizen of the United States, residing in the borough of Manhattan, in the city, county, and State of New York, have invented certain new and useful Improvements in Booster Apparatus, of which the following is a specification, reference being had to the accompanying drawing, forming a part hereof.

This invention relates to devices for boosting the current-potential in electrical systems of distribution; and its object is to provide an improved means of regulation in order to secure as nearly as possible a constant flow of current from the supply-generator regardless of the variations in the external load.

It is well known that in an electrical system of supply and distribution where storage batteries or similar electrical machines are employed either as a source of power or as consumption devices the electromotive force of the system is subject to constant variation, due to the changes which are constantly taking place in the condition of the storage batteries. It is therefore desirable to provide a means of boosting the electromotive force of the system either positively or negatively, but proportionately to the rise and fall of the voltage.

In Letters Patent of the United States No. 648,874, granted to me May 1, 1900, for improvements in booster apparatus for systems of electrical distribution there is described a means of regulation for a boosting device in which the auxiliary generator or booster in series on the line and the speed of the armature of the auxiliary generator or booster is made responsive to current conditions in the booster-circuit. In the present invention the arrangement of the circuits of the motor-field has been changed to make the changes in speed of the booster-armature conform more accurately with the changes in the current contions of the line.

In the accompanying drawing a diagrammatic view of a system of electrical distribution embodying this invention is illustrated.

The main generator or dynamo (shown at 3) supplies current to the generator bus-bars 1 and 2. The power bus-bars 1' and 2', which supply current to the consumption-circuit 4 4' and under certain conditions to a storage battery 5, are in circuit with the generator bus-bars 1 and 2, the bus-bars 1 and 1' being connected by a conductor 9 and the bus-bars 2 and 2' being connected through auxiliary generator or booster 7, coil 17, and conductors 8 and 24.

It will be understood that conductor 9 is diagrammatically illustrated and may comprise a plurality of resistances, storage batteries, and other electrical devices which it may be found desirable to insert and that the consumption-circuit is also diagrammatically illustrated and may comprise lamps, motors, storage batteries, translating devices, and any other form of electrical apparatus to which current is required to be supplied. The storage battery illustrated at 5 is an auxiliary source of current and supplies energy to the external circuit when the electromotive force of the storage battery is greater than the potential between the points on the line at which the terminals of said battery are connected. When the electromotive force of the storage battery at any time becomes less than the potential between the points at which the terminals of the battery are connected, then said battery will receive current from the line and will be charged.

An auxiliary generator or booster 7 is located in series on the line, its brushes being connected, respectively, with bus-bars 2 and 2' by means of conductors 24 and 25, coil 17, and conductor 8. Preferably the field-windings of this generator or booster 7 are in shunt with the armature-winding of the same and are so shown in the drawing. A motor 13, which may be driven by any source of electric current, preferably by placing it in circuit across the line, as shown in the drawing, is adapted to drive generator 7, the armature of the latter being operatively connected with the motor for this purpose. The magnetic field of this motor is energized by two distinct circuits, which are differentially wound, or, in other words, wound to oppose each other. One of these circuits comprises a coil 17, which is in series on the line, and the other circuit comprises a winding 14, which is connected across the brushes of the auxiliary generator or booster 7. These windings are so proportioned that the magnetomotive force of coil 17 is greater than that of winding 14, and the motor-field, which is the resultant energization produced by these two circuits, will be in the same direction as that produced by coil 17. It will be obvious that the current variations in coil 17 will be the variations of the line-current and that the variations of the current in winding 14, which are due to changes of speed of the booster-armature, will vary as some function of the speed of the booster.

The operation of the system is as follows: When for any reason there is an increase of current in the line, the magnetic field of the motor will first receive an increment of energy, thereby causing the armature of the motor, and accordingly the armature of the auxiliary generator or booster, to be driven with less speed. This slowing down of the auxiliary generator or booster results in a decrease of voltage at the booster-brushes, and consequently a decreased current will flow through winding 14, the variations of current in the line therefore being accompanied by inverse variations of current in winding 14. Inasmuch as the field-windings of the motor oppose each other the change in field magnetization is equal to the sum of the changes in windings 14 and 17, and the decrease of current strength in winding 14 will therefore tend to increase the resultant energization of the motor-field. The slowing down of the booster will also be accompanied by a slight decrease of current strength in coil 17, which tends to decrease the energization of the motor-field; but until the effect of the decrease of the currents in both winding 14 and coil 17 are precisely equal the motor will be driven either faster or slower and the magnetic effect of the current variations in the circuits of the motor-field will be cumulative. The result will be that the variations of current in the line will produce a double effect upon the energization of the motor-field and will cause the booster to respond to the current conditions of the line.

As the resistance varies in the work-circuit the battery at 5 will be charged and discharged—that is, when the resistance increases in the work-circuit an extra voltage will be generated by the booster and the battery will be charged, and upon a decrease of resistance in the work-circuit the voltage from the booster will drop and the battery will discharge. In this way the fluctuations in the system caused by the variations in the resistance of the work-circuit will be taken up by the battery and the booster.

It will be understood that the circuit through winding 14 of the motor-field may include the field-circuit of the booster, it being obvious that as the construction of the booster is varied it may be desirable to so connect the terminals of the winding 14 with the booster as to include its field-circuit.

I claim as my invention—

1. In a system of electrical distribution, the combination with a main generator and consumption devices, of an auxiliary generator in series on the line, and a motor operatively connected with the armature of said auxiliary generator, said motor having two field-circuits which are differentially wound and which are connected with the line in such a way that variations of current strength in the line will cause like variation of current strength in one of said circuits and inverse variations of current strength in the other of said circuits.

2. In a system of electrical distribution, the combination with a main generator and consumption devices, of an auxiliary generator in series on the line, and a motor operatively connected with the armature of said auxiliary generator, said motor having two field-circuits which are differentially wound and one of which circuits is in series on the line and will therefore have like variations of current strength as the line, while the other of which circuits is so connected with the line that it will have variations of current strength inversely proportional to the variations of current strength of the line.

3. In a system of electric distribution, the combination with a main generator and consumption devices, of an auxiliary generator in series on the line, and a motor operatively connected with the armature of said auxiliary generator, said motor having two field-circuits which are wound to oppose each other and one of which is in series with the line while the other of which is in shunt across the brushes of the auxiliary generator.

4. In a system of electrical distribution, the combination with a main generator and a storage battery, of an auxiliary generator in series on the line, and a motor operatively connected with the armature of said auxiliary generator, said motor having two field-circuits which are wound to oppose each other and one of which is in series with the line while the other of which is in shunt across the brushes of the auxiliary generator.

This specification signed and witnessed this 20th day of August, A. D. 1902.

LAMAR LYNDON.

In presence of—
PAUL MELTON,
F. G. COATES.